Sept. 10, 1940.　　　D. D. GOLDBERG　　　2,214,324
VALVE
Original Filed Oct. 20, 1937　　2 Sheets-Sheet 1
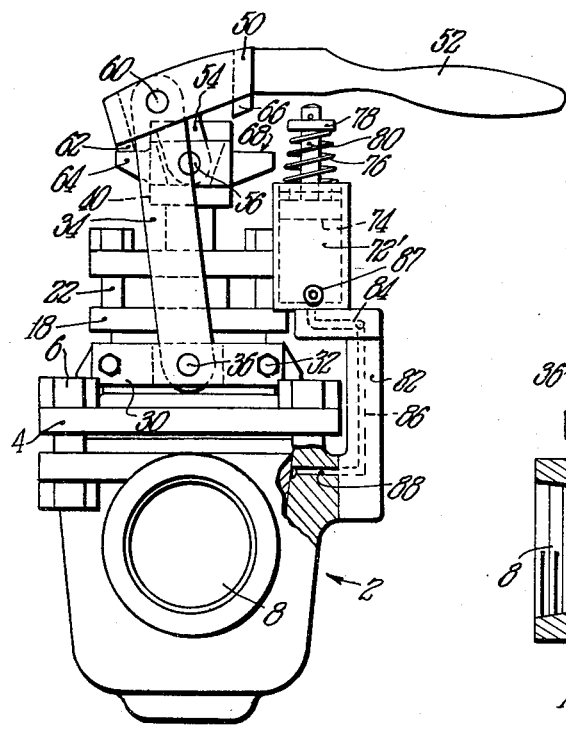
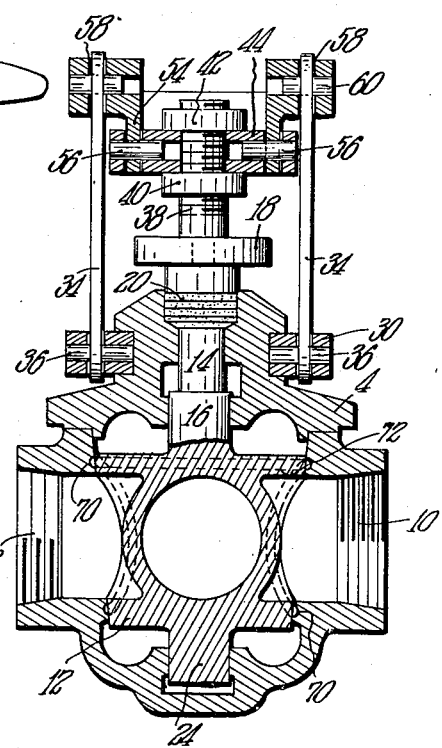
Inventor
David D. Goldberg
Walter C. Ross
Attorney

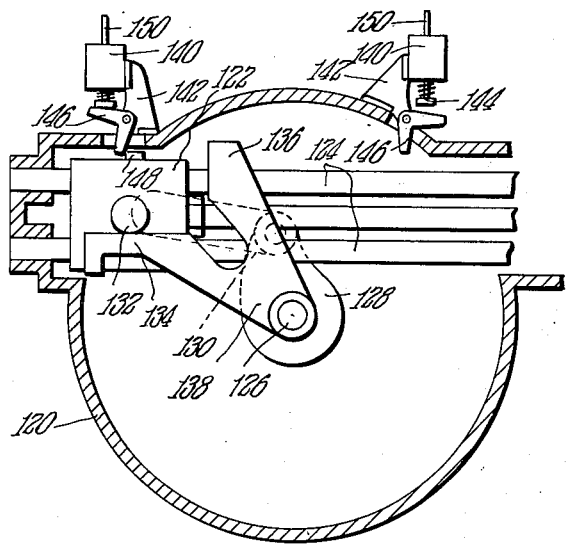

Patented Sept. 10, 1940

2,214,324

UNITED STATES PATENT OFFICE 2,214,324

VALVE

David D. Goldberg, Springfield, Mass., assignor to Chapman Valve Manufacturing Company, Indian Orchard, Mass., a corporation of Massachusetts Original application October 20, 1937, Serial No. 170,000, now Patent No. 2,169,525, dated August 15, 1939. Divided and this application July 17, 1939, Serial No. 284,853

1 Claim. (Cl. 251—97)

This invention relates to improvements in valve apparatus and is directed more particularly to improvements in cone valves and the like and this application is a division of an application filed by me October 20, 1937, Serial No. 170,000, now Patent 2,169,525, granted Aug. 15, 1939.

According to the principal objects of the invention a cone valve is provided which includes a body having a tapering seat or bore, a cone or plug, and novel operating means to move the plug axially between seated and non-seated positions and rotate the same between open and closed positions.

According to another object of the invention, means is provided for feeding a sealing and/or lubricating medium which is operable to supply the lubricant or sealing medium to the coacting surfaces of the plug and valve body and journal parts not only to seal the joints but to act as a lubricant to facilitate operation, the said means being operable accordingly as the plug is moved from one position to another.

Various other novel features and advantages of the invention will be hereinafter more fully referred to in connection with the accompanying description of the present preferred form of the invention reference being had to the accompanying drawings, wherein:

Fig. 1 is an elevational view of a valve apparatus embodying the novel features of the invention;

Fig. 2 is a longitudinal sectional elevational view of the valve apparatus shown in Fig. 1;

Fig. 3 is a plan view of the valve apparatus shown in Fig. 1 with parts removed for clearness;

Fig. 4 is a detailed enlarged sectional elevational vew to explain certain features of the invention;

Fig. 5 is a fragmentary side elevational view of certain parts of a valve apparatus to illustrate a modified form of the invention;

Fig. 6 is a plan view of the parts shown in Fig. 5; and

Fig. 7 is a plan view of valve operating mechanism illustrating another modified form of the invention.

Referring now to the drawings more in detail, the invention will be fully described.

The valve apparatus shown in Figs. 1, 2 and 3 includes a body 2 and a cap 4 which may be secured together in some suitable manner as by bolts 6. The body 2 is provided with inlet and outlet ports 8 and 10 which may be screw-threaded as shown for receiving a pipe or said ports may be flanged or otherwise provided with connections for connecting the valve to a pipe line.

A valve plug 12, sometimes called a cone, is provided which is preferably tapering and the body is provided with a tapering seating bore to receive the said plug. A stem 14 associated with the plug extends upwardly therefrom and it, as well as a part 16 associated with the plug, may be journalled in the cap 4 for reciprocating and rotating movements.

It is ordinary practice to provide a stuffing box for the stem or spindle of the plug and this may be in the form of a gland 18 disposed on the upper side of a packing 20.

The gland 18 in the form of the invention shown is urged downwardly by bolts 22, or the said gland may be of the screw type if desired. A pilot or lower journal 24 is provided on the plug 12 which has a bearing in the body which together with the upper part of the plug and stem which are journalled in the cap guide the plug for its reciprocating and rotating movements.

The plug is movable up and down between seated and non-seated positions in the bore and is rotatable between open and closed positions. In operation the plug is moved upwardly from off its seat, rotated and then reseated.

A collar 30 is rotatably disposed around the upper part of the cap 4 and is held against axial movements. It may be formed of two halves bolted together as by bolts 32 as shown. Links 34 are pivoted at 36 to the collar in any suitable way and the lower ends of the links 34 as shown in the drawing are received in slots 31 of the collar.

The upper end of the stem or spindle 14 is threaded at 38 and collars 40 and 42 are in screw-threaded engagement therewith. A yoke 44 is provided on the spindle between the collars 40 and 42 and the yoke may be moved up and down by the collars for locating the yoke on the spindle in various positions of adjustment. The yoke is non-rotatable relative to the spindle and this may be accomplished by any suitable means such as a key in the spindle disposed in a slot of the yoke.

An operating member in the form of a lever 50 having a manually engageable handle part 52 has lugs 54 which are pivotally connected at 56 to the yoke 44. Slots 58 in opposite sides of the operating member receive the upper ends of the links 34 which are pivotally connected at 60 to the operating member.

The parts are so arranged that as the lever 50 is swung up and down the spindle 14 and thereby the plug 12 is raised and lowered or moved between seated and non-seated positions. In Fig. 1, lever 50 is in the non-seated position of the plug. When swung downwardly or clockwise, it is then in a position wherein the plug is seated in its bore in the body.

A stop 62 of the operating member engages with a stop 64 of the yoke as shown to limit the movement of the lever in one direction. Another stop 66 and stop 68 of the yoke engage when the operating member is in plug seated position. When the lever is swung upwardly from the position shown in Fig. 1, it may be rotated to rotate the plug between its open and closed positions. As stated, in Fig. 1 the lever 50 is shown in an elevated or plug unseated position, and for clearness, is shown as being midway between open and closed positions of the plug.

The operating mechanism works with a toggle action so that the operating member is releasably locked in its plug seating position. Adjustment is provided by moving the collars 40 and 42 along the spindle to move and position the yoke. This makes it possible to adjust the parts so that the plug may be forced into the desired and proper seating position by means of the operating mechanism and any inaccuracy in machining or assembling of the parts may be easily and readily compensated for.

According to the invention it is desired to supply a sealing and lubricating medium to the coacting surfaces of the plug and body structure so as to prevent leakage and facilitate ease in operation and the sealing and/or lubricating medium will be hereinafter called medium.

To that end, groove 70 is provided in the coacting surfaces of the plug and body. These are preferably around the ports 8 and 10 and connected by a communicating groove indicated by 72. It will be understood that the grooves and as many as desired may be in the plug or body or both or partly in the plug and partly in the body.

Cylinders 72' are provided which have pistons 74 reciprocable therein. The pistons may be maintained in elevated positions by springs 76 interposed between the upper ends or sides of the cylinders and collars 78 on rods 80 associated with the pistons.

A bracket or connection 82 is associated with the body and cylinders and it has passageways or ducts such as 84 and 86 in communication with the cylinders and with a passageway or passageways such as 88 in the body leading to at least one of the grooves 72 of the seating surfaces of the body and cap.

The cylinders are positioned so that the rods 80 are engaged by the operating member when it is moved to seat the plug in either the open or closed positions of the plug. That is, when the operating member has been swung horizontally to position the plug for moving it downwardly to seated position and is swung downwardly it engages a piston rod 80 to force it downwardly and thereby causes the piston to force the medium within the cylinder through a passageway into the grooves around the seating surfaces of the plug and body. Therefore, each time that the plug in open or closed position is moved to seated position a supply of medium is forced into the grooves to seal the plug thereby eliminating leakage and supplying lubricant to facilitate ease in unseating the plug.

In addition to the grooves associated with the seating surfaces of the plug, it will be obvious that it is an easy matter to provide communication between the one or both cylinders and the bearings for the upper and lower ends of the plug so that the said bearings will receive a charge of medium.

It will be desired, as shown in Fig. 4, to provide some means to prevent the sealing medium from being forced from one cylinder to another. To that end a check valve or valves may be placed in the communicating passageways or cylinders.

In Fig. 4 there is shown a check valve 90 which is in the form of a ball that is urged upwardly by a spring 92. As the medium is forced downwardly from the cylinder 72 by a piston therein, it forces the valve downwardly so as to pass thereby. When pressure is exerted upwardly against the valve by the other cylinder, it assumes its seated position to prevent the medium being forced upwardly.

Stops 96 and 98 on the member 30 coact with stops 100 and 102 on the cap so that the operating mechanism is limited in its horizontal rotation thereby to accurately position the plug in either open or closed position.

The cylinders may be supplied with lubricant in any suitable manner as for instance by pressure means applied to a fitting indicated by 87 which as usual includes a check valve.

From the foregoing it will be observed that the plug is moved between seated and non-seated positions and between open and closed positions by a novel operating mechanism which is readily adjustable and that means for supplying a lubricating and sealing medium is operable by the operating means.

In the foregoing the pistons are depressed to cause the medium to be forced from the cylinders but it will be possible to construct the apparatus so that upward movements of the pistons will bring about feeding of the medium.

In some cases it may be desired to employ a single cylinder and piston operable by the operating means in its valve open and closed positions. To that end as shown in Figs. 5 and 6 the operating member 110 has parts 112 for entering a slot 114 of the piston rod 116. With this arrangement as the operating member is moved from the neutral central position shown in Fig. 6 to the closed or open position of the plug a part 112 of the operating member enters the slot 114. Then when the operating member is swung to move the plug vertically of the bore the rod 116 is reciprocated to actuate the piston and feed the medium.

As shown in Fig. 7 the invention is applicable to operating mechanism for operating the plug. In Fig. 7 a casing is shown at 120 and a cross head 122 is reciprocable back and forth on rods 124. A valve stem is represented by 126 and a lever 128 is threadedly connected thereto and to the cross head 122 by a link 130. A part 132 on the cross head engages with arms 134 and 136 a member 138 fixed to the stem 126. As the crosshead is moved back and forth the levers 128 and 138 swing back and forth so that the plug is moved up and down between seated and non-seated positions and rotated between open and closed positions.

Cylinders 140 supported by brackets 142 on the casing 120 have pistons therein provided with rods 144 and levers 146 having angularly disposed arms are pivoted as shown. An arm 70 of the levers are arranged to lie in the path of movement of a part 148 of the cross head and the other arms are arranged to act on the piston rods all as shown. As the cross head moves between open and closed positions of the plug the levers are operated and in turn act on the rods so that medium is fed from the cylinders which may be connected by pipes such as 150 to grooves and other parts that it is desired to supply the medium to.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What it is desired to claim and secure by Letters Patent of the United States is:

A valve apparatus comprising in combination, a body, a plug rotatable therein between closed and open positions and reciprocable between seated and non-seated positions in either open or closed positions, a spindle fixed to said plug, channel means associated with the coacting surfaces of said body and plug, means for actuating said spindle including a member movable between open and closed positions of the plug and between seated and non-seated positions thereof when the plug is in either open or closed positions, means for supplying lubricant to said channels connected thereto including lubricant containers and movable actuating members therein disposed in the path of movement of the actuating means member when in either closed or open position of the plug.

DAVID D. GOLDBERG.